United States Patent
De Nicolo

(10) Patent No.: US 6,295,356 B1
(45) Date of Patent: Sep. 25, 2001

(54) POWER FEED FOR NETWORK DEVICES

(75) Inventor: Maurilio Tazio De Nicolo, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/562,920

(22) Filed: May 2, 2000

Related U.S. Application Data

(63) Continuation of application No. 09/048,922, filed on Mar. 26, 1998, now Pat. No. 6,115,468.

(51) Int. Cl.[7] ................................................. H04M 1/00
(52) U.S. Cl. ..................... 379/413; 379/412; 379/324; 375/257; 375/258; 375/285; 333/177
(58) Field of Search ................................... 379/413, 412, 379/400, 324, 90.01; 375/257, 258, 285; 370/352, 356; 333/177, 32; 363/17; 323/247, 270

(56) References Cited

U.S. PATENT DOCUMENTS

| | | | |
|---|---|---|---|
| Re. 33,900 | 4/1992 | Howson | 370/105 |
| 4,131,767 | 12/1978 | Weinstein | 179/170.2 |
| 4,161,719 | 7/1979 | Parikh et al. | 340/147 |
| 4,232,199 | 11/1980 | Boatwright et al. | 179/18 |
| 4,397,020 | 8/1983 | Howson | 370/105 |
| 4,532,626 | 7/1985 | Flores et al. | 370/85 |
| 4,723,267 | 2/1988 | Jones et al. | 379/93 |
| 4,875,223 * | 10/1989 | Curtis | 375/258 |
| 4,969,179 | 11/1990 | Kanare et al. | 379/33 |
| 5,029,201 | 7/1991 | Bindels | 379/98 |
| 5,056,131 | 10/1991 | Kanare et al. | 379/33 |
| 5,199,049 | 3/1993 | Wilson | 375/104 |
| 5,223,806 * | 6/1993 | Curtis et al. | 333/12 |
| 5,285,477 | 2/1994 | Leonowich | 375/36 |
| 5,311,518 | 5/1994 | Takato et al. | 370/110.1 |
| 5,321,372 * | 6/1994 | Smith | 333/1 |
| 5,541,957 | 7/1996 | Lau | 375/258 |
| 5,574,748 | 11/1996 | Vander Mey et al. | 375/204 |
| 5,655,077 | 8/1997 | Jones et al. | 395/187.01 |
| 5,659,542 | 8/1997 | Bell et al. | 370/496 |
| 5,671,354 | 9/1997 | Ito et al. | 395/187.01 |
| 5,684,950 | 11/1997 | Dare et al. | 395/187.01 |
| 5,796,185 | 8/1998 | Takata et al. | 307/140 |
| 5,799,040 | 8/1998 | Lau | 375/258 |
| 5,802,042 | 9/1998 | Natarajan et al. | 370/255 |
| 5,815,665 | 9/1998 | Teper et al. | 395/200.59 |
| 5,918,016 | 6/1999 | Brewer et al. | 395/200.5 |
| 5,944,824 | 8/1999 | He | 713/201 |
| 5,994,998 | 11/1999 | Fisher et al. | 340/310.01 |
| 6,011,910 | 1/2000 | Chau et al. | 395/200.59 |
| 6,021,496 | 2/2000 | Dutcher et al | 713/202 |
| 6,047,376 | 4/2000 | Hosoe | 713/201 |
| 6,092,196 | 7/2000 | Reiche | 713/200 |
| 6,115,468 | 9/2000 | De Nicolo | 379/413 |
| 6,134,666 | 10/2000 | De Nicolo | 713/300 |
| 6,140,911 * | 10/2000 | Fisher et al. | 340/310.01 |

FOREIGN PATENT DOCUMENTS

99/53408    10/1999   (WO) ............................. G06F/15/16

* cited by examiner

Primary Examiner—William Korzuch
Assistant Examiner—Vijay B Chawa
(74) Attorney, Agent, or Firm—David B. Ritchie; Thelen Reid & Priest LLP

(57) ABSTRACT

An Ethernet device power transmission system includes an input transformer, an output transformer and a pair of twisted pair conductors. The input transformer includes a pair of primaries for connection to a source of Ethernet data. The input transformer also includes a pair of secondaries, each having a center-tap. A first twisted pair conductor is connected across the first secondary, a second twisted pair conductor is connected across the second secondary and a DC-bias is provided between the respective center taps of the first and second secondaries. At the local end, the output transformer includes a first and second center-tapped primary and a first and second secondary for connection to the load device. The first and second primary center taps are connected to a power processor for extraction of DC power.

60 Claims, 3 Drawing Sheets

POWER FEED FOR NETWORK DEVICES

This application is a continuation of Ser. No. 09/048,922 filed Mar. 26, 1998 U.S. Pat. No. 6,115,468.

BACKGROUND OF THE INVENTION

1. Field of the Invention

The present invention is directed to a method and apparatus which provide electrical power to ethernet-based telephones over an ethernet wire link.

2. The Background Art

Telephones require electrical power in order to operate. The power can be delivered over the telephone lines or via a separate power connection, typically through a power transformer connected to the electrical power grid. Telephones powered in the latter fashion will be inoperable during a power failure unless provision is made both locally at the telephone and at the PBX or local telephone switch for emergency power to be supplied. While it is normal to provide an uninterruptible power supply to an office's PBX or telephone switch, it is not desirable for cost and other reasons to provide electrical power back up systems to each telephone location. In the past, the power problem was frequently solved by using an 8-wire telephone connection to the telephone switch. With 8 wires there is more than enough capability for analog audio digital and power connections to the telephone switch.

The growth of the Internet and similar local and wide area networks based on Ethernet technology has created a potential market for telephone systems which would connect directly to existing Ethernet connections. The Ethernet protocol, however, does not provide a mechanism for powering such telephones. A typical Ethernet connection to an office location would include a pair of unshielded twisted pair (UTP) lines for a total of four conductors—one pair for transmit, one for receive. The transmit pair is dedicated to send packets of data over the Ethernet connection; the receive pair receives packets of data over the Ethernet connection. Simply placing a DC bias on two or more of these conductors and using the bias to power a local Ethernet telephone is risky because the bias is not part of the Ethernet protocol and might damage Ethernet compliant equipment not designed to handle such a bias.

Turning to FIGS. 1 and 2, a prior art scheme for providing power over a single twisted pair connection is shown. In the prior art, system 10 and power supply 11 provides DC power over lines 12 (positive lead) and 14 (negative lead) to a series of ports on the network. Filter capacitor 16 and filter inductors 18 and 20 are preferably provided to insure a clean source of DC power and to avoid AC cross-talk between the network and the power supply. Each port 22, 24 and 26 of the network is coupled to a twisted pair link 28, 30 and 32, respectively, via a transformer, 34, 36, and 38, respectively. Transformer 34, for example, operates as follows: Data on port 1 (22) is applied to the primary 40 of transformer 34 and coupled to a pair of secondary winding 42, 44 of transformer 34 through transformer core 46 in a conventional manner. One end 48 of secondary winding 42 is connected to twisted pair 28 and the other end 50 of secondary winding 42 is connected to the positive lead 12 of power supply 11. One end 52 of secondary winding 44 is connected to twisted pair link 28 and the other end 54 of secondary winding 44 is connected to the negative lead 14 of power supply 11. Leads 50 and 54 are AC-coupled to one another with capacitor 56 as shown. This blocks DC current from flowing and allows a DC bias to be established over the two conductors of twisted pair link 28 while simultaneously allowing the flow of data over the link.

At the telephone end of the twisted-pair link 28, a similarly structured transformer 58 receives the data signal as well as the DC bias. First primary 60 and second primary 62 are AC-coupled with capacitor 64 so as to be able to couple data signals from twisted-pair link 28 with transformer 58 while holding off a DC bias. The DC bias of twisted-pair link 28 is applied to a power processor 66 and from there provides to local equipment to be powered by the twisted pair system. A typical embodiment of a power processor 66 is shown in FIG. 2. It comprises a filter 68, a rectifier 70, a filter capacitor 72 and a DC-DC converter 74.

While fit for its intended purpose, the above-described system has some drawbacks which make it a less than ideal choice for an Ethernet environment. For example, each secondary 42 and 44 of transformer 34 and each primary 60 and 62 of transformer 58 will experience a net current flow equal to the total amount of current drawn by the load at the distal end of the twisted-pair link. This current will affect the choice of transformer core size at each end of the link and will affect the choice of wire gauge used for the link.

It would be desirable to provide an improved method and apparatus for powering Ethernet telephones over a 4-wire link. Such a system would be able to take advantage of existing wiring without the need to rewire the premises to install such devices. Furthermore, by providing power over the Ethernet connection, power transformers are not required at the device location, and a central uninterruptible power supply is made possible to provide power to the entire telephone system in case of a power failure.

SUMMARY OF THE INVENTION

An Ethernet device power transmission system provides electrical power to devices such as Ethernet telephones and related equipment over a 4-wire Ethernet connection without any need for rewiring premises having an existing 4-wire Ethernet system. The system eliminates any requirement for local power such as transformers to power such equipment as all power can be provided over the existing Ethernet wiring. A central uninterruptible power supply (UPS) is thereby made possible to provide back-up power to all such equipment. The system includes an input transformer, an output transformer and a pair of twisted pair conductors. The input transformer includes a pair of primaries for connection to a source of Ethernet data. The input transformer also includes a pair of secondaries, each having a center-tap. A first twisted pair conductor is connected across the first secondary, a second twisted pair conductor is connected across the second secondary and a DC-bias is provided between the respective center taps of the first and second secondaries. At the local end, the output transformer includes a first and second center-tapped primary and a first and second secondary for connection to the load device. The first and second primary center taps are connected to a power processor for extraction of DC power.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to is such skilled persons from an examination of the within disclosure.

Figure 3:
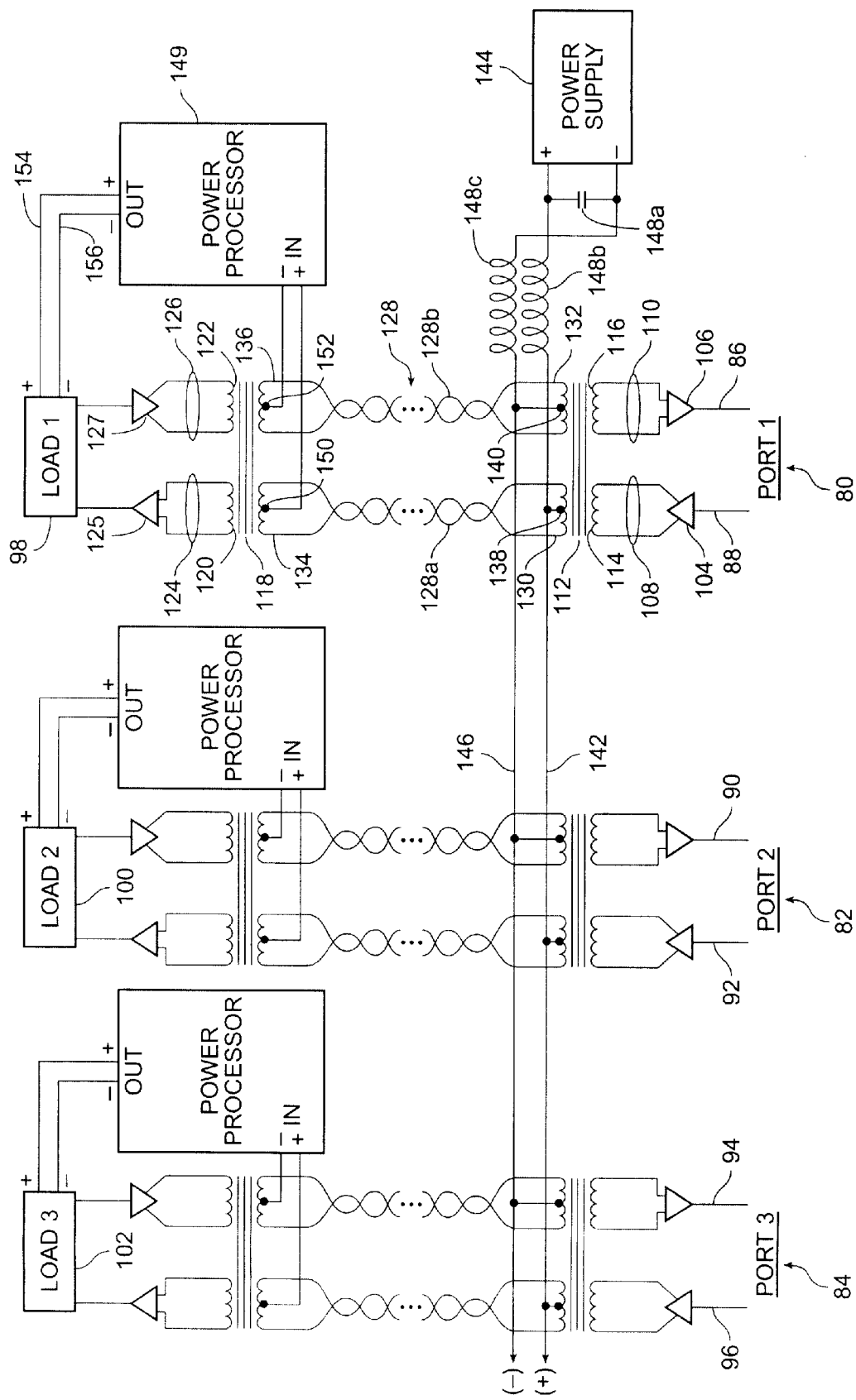
FIG. 3 is an electrical schematic diagram of an Ethernet telephone power distribution system according to a presently preferred embodiment of the present invention.

Turning now to FIG. 3, in accordance with a presently preferred embodiment of the present invention, a system including a plurality of data ports 80, 82, 84 is provided to transmit data on lines 86, 88, 90, 92, 94, 96 to and from load devices 1 (98), 2 (100) and 3 (102). Load devices 98, 100 and 102 may be Ethernet telephones and/or other Ethernet devices requiring power to be transmitted to them in addition to data over Ethernet twisted pair lines.

Turning to Port 1 (80) as an example, data on lines 88 and 86 is provided to transmitter 104 and from receiver 106, respectively. Transmitter 104 drives twisted pair 108. Receiver 106 receives from twisted pair 110. First transformer 112 includes a first primary 114 and a second primary 116. First primary 114 is connected to twisted pair 108 and second primary 116 is connected to twisted pair 110.

At load 98 a similar arrangement exists. Second transformer 118 includes a first secondary 120 and a second secondary 122. These are respectively connected to twisted pairs 124 and 126 which are, in turn, connected through receiver 125 and transmitter 127 to load device 98.

Ethernet link 128 couples first and second secondaries 130, 132 of first transformer 112 to first and second primaries 134, 136 of second transformer 118. Ethernet link 128 preferably comprises a pair of twisted pair conductors 128a and 128b wherein twisted pair 128a connects first secondary 130 to first primary 134 of the twisted pair 128b connects second secondary B2 to several primary 136.

Figure 2:
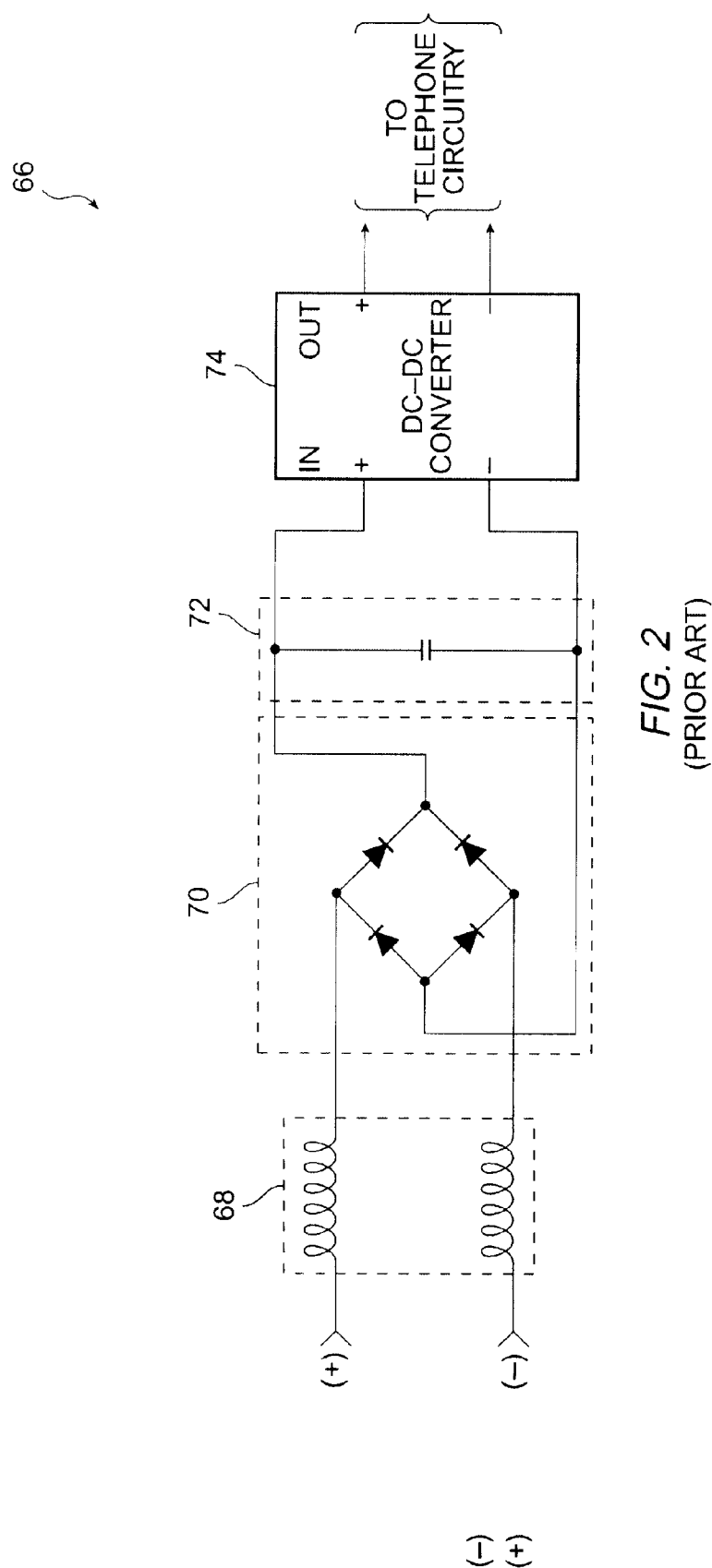
FIG. 2 is an electrical schematic diagram of a prior art telephone power extraction system or power processor.

Power coupling is provided as follows. Secondaries 130 and 132 of first transformer 112 each include a center tap, 138, 140 respectively. Center tap 138 is connected to the positive lead 142 of a power supply 144 and center tap 140 is connected to the negative lead 146 of power supply 144 which may preferably be an uninterruptible power supply (UPS). DC filtering components 148a, 148b, 148c may be provided as well known to those of ordinary skill in the art. Now the entire loop of twisted pair 128a is at the potential of positive lead 142 while the entire loop of twisted pair 128b is at the potential of negative lead 146. A power processor 149, as in FIG. 2, may preferably be attached to center taps 150, 152, respectively, of first and second primaries 134 and 136 of second transformer 118 so as to provide a DC power source to power processor 149. Power processor 149 performs any DC-DC power conversion and filtering required and provides power over leads 154, 156 to load 98 which may be an Ethernet telephone or other device.

Figure 1:
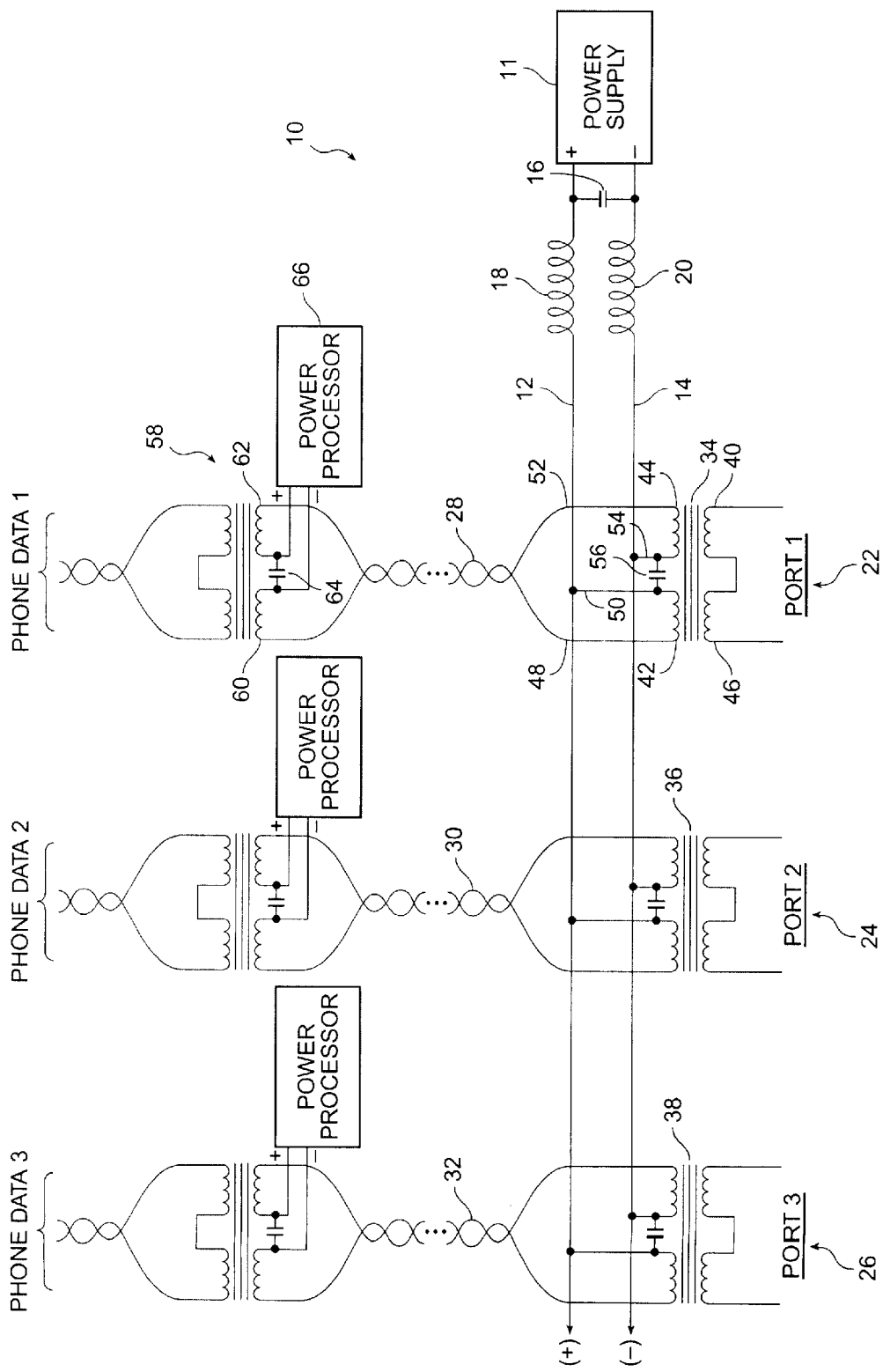
FIG. 1 is an electrical schematic diagram of a prior art telephone power distribution system for use over a two-wire twisted pair system.

The present invention provides a number of advantages over the prior art. First, power delivered to the load device is split equally over four wires rather than two reducing the current carrying requirements of all four wires over a two wire system delivering the same amount of power. Second, because the transmitted power is applied at and removed at center taps, there is no net current flow due to the DC bias through either primary or secondary of each respective twisted pair 128a, 128b. This reduces the size requirements for the transformer 112, 118 core over a system with a net current, as in the system of FIG. 1. This permits off-the-shelf transformers for Ethernet applications to be used maintaining compatibility with Ethernet systems not having this power delivery requirement. Note that if the prior art system of FIG. 1 were used with a load device lacking decoupling between the two primaries on the network side of the transformer, the power supply would be effectively shorted. In the system according to FIG. 3, as long as the separate data channels are not shorted (which would not normally occur), any interface can be used on the load side of the network—whether it makes use of the power available there or not.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. In particular, the use of the term primary and secondary in referring to transformer windings herein is for explanation only. As the links are bi-directional, the terms primary and secondary may be interchanged as would be known to those of ordinary skill in the art. The invention, therefore, is not to be limited except in the spirit of the appended claims.

What is claimed is:

1. An Ethernet telephone adapted to be supplied with electrical power over an Ethernet connection from a remote source of power, said Ethernet telephone comprising:

a transformer including a first primary with a first center-tap, a second primary with a second center-tap, a first secondary and a second secondary, said first and second secondaries for coupling data to an Ethernet telephone, said first and second primaries for coupling data to an Ethernet telephone, said first and second primaries for coupling, respectively, to first and second pairs of conductors of the Ethernet connection;

a first potential input of the Ethernet telephone coupled to said first center-tap of said transformer; and a second potential input of the Ethernet telephone coupled to said second center-tap of said transformer.

2. An Ethernet telephone according to claim 1, wherein said first pair of conductors is a twisted pair.

3. An Ethernet telephone according to claim 2, wherein said second pair of conductors is a twisted pair.

4. A remote device supplied with DC electrical power over a connection from a source of power, said device comprising:

a transformer including a first primary with a first center-tap, a second primary with a second center-tap, a first secondary and a second secondary, said first and second secondaries for coupling to the remote device, said first and second primaries for coupling, respectively, to first and second pairs of conductors of the connection;

a first potential input of the remote device coupled to said first center-tap of said transformer; and a second potential input of the remote device coupled to said second center-tap of said transformer.

5. A device according to claim 4, wherein said first pair of conductors is a twisted pair.

6. A device according to claim 5, wherein said second pair of conductors is a twisted pair.

7. A device for transceiving data and a DC signal simultaneously over a connection from a remote source of power, said device comprising:

a transformer including a first primary with a first center-tap, a second primary with a second center-tap, a first secondary and a second secondary, said first secondary for coupling to a first pair of conductors over which a first data signal is to be communicated with the device, and said second secondary for coupling to a second pair of conductors over which a second data signal is to be communicated with the device;

a first potential input of the device coupled to said first center-tap of said transformer; and a second potential input of the device coupled to said second center-tap of said transformer.

8. A method for supplying a DC power connection and a bi-directional data connection to a device, said bi-directional data connection including a first data signal and a second data signal, said method comprising:

transmitting the first data signal to a first primary winding of a transformer;

transmitting the second data signal from a second primary winding of said transformer;

transmitting the first data signal to the device over a first secondary winding of said transformer;

receiving the second data signal from the device over a second secondary winding of said transformer;

extracting a DC signal from a center-tap of said first primary winding of said transformer and a center-tap of said second primary winding of said transformer; and applying said extracted DC signal to the device.

9. A power feed system for supplying power to Ethernet telephones, said system comprising:

a first and a second center-tapped winding disposed in a transformer, each said winding having a first conductor, a second conductor and a center-tap conductor, said first and second conductors adopted for connection to an Ethernet telecommunications link;

a third and fourth winding disposed in said transformer, each said winding having a first conductor and a second conductor, said first and second conductors adapted to couple a data signal to the Ethernet telephone; and means for extracting a power signal from said first center-tap conductor and said second center-tap conductor of said transformer and for applying said extracted power signal to the Ethernet telephone.

10. A system for supplying DC power to a remote device, said system comprising:

a first and second center-tapped winding disposed in a transformer, each said winding having a first conductor, a second conductor and a center-tap conductor;

a third and fourth winding disposed in said transformer, each said winding having a first conductor and a second conductor;

first coupling means for coupling first and second pairs of conductors, respectively, of the remote device to said third and fourth windings of said transformer;

means for extracting a power signal from said first center-tap conductor and said second center-tap conductor of said transformer and for applying said extracted power signal to the remote device.

11. A method for supplying DC power to a remote device over an Ethernet connection having a first twisted pair of conductors for transmission of data packets from said remote device and a second twisted pair of conductors for reception of data packets at said remote device, the method comprising:

extracting a first level of the DC power from a center tap of a first transformer winding coupled across a proximal end of the first twisted pair of conductors; and extracting a second level of the DC power from a center tap of a second transformer winding coupled across a proximal end of the second twisted pair of conductors.

12. A system for supplying DC power to a remote device over an Ethernet connection having a first twisted pair of conductors for transmission of data packets from said remote device and a second twisted pair of conductors for reception of data packets at said remote device, the system comprising:

means for extracting a first DC power level from a center-tap of a first transformer winding coupled across a proximal end of the first twisted pair of conductors; and means for extracting a second DC power level from a center tap of a second transformer winding coupled across a proximal end of the second twisted pair of conductors.

13. A system according to claim 12 further comprising an uninterruptible power supply for sourcing the DC power.

14. A power feed system for Ethernet telephones, said system comprising:

a first transformer including a first primary, a second primary, a first secondary with a first center-tap and a second secondary with a second center-tap, said first primary for coupling to a first pair of conductors, said second primary for coupling to a second pair of conductors; and a direct current power supply having a first output potential on a first line and a second output potential different from said first output potential on a second line, said first line coupled to said first center-tap of said first transformer and said second line coupled to said second center-tap of said first transformer.

15. A power feed system for Ethernet telephones according to claim 14, wherein said first pair of conductors is a twisted pair.

16. A power feed system for Ethernet telephones according to claim 15, wherein said second pair of conductors is a twisted pair.

17. A system for supplying DC power to a remote device, said system comprising:

a first transformer including a first primary, a second primary, a first secondary with a first center-tap and a second secondary with a second center-tap, said first primary for coupling to a first pair of conductors, said second primary for coupling to a second pair of conductors; and a direct current power supply having a first output potential on a first line and a second output potential different from said first output potential on a second line, said first line coupled to said first center-tap of said first transformer and said second line coupled to said second center tap of said first transformer.

18. A system according to claim 17, wherein said first pair of conductors is a twisted pair.

19. A system according to claim 18, wherein said second pair of conductors is a twisted pair.

20. A system for transmitting data and a DC signal simultaneously from a first device, said system comprising:

a first transformer including a first primary, a second primary, a first secondary with a first center-tap and a second secondary with a second center-tap, said first primary for coupling to a first pair of conductors over which a first data signal is to be communicated with the first device, said second primary for coupling to a second pair of conductors over which a second data signal is to be communicated with the first device; and a direct current power supply associated with the first device having a first output potential on a first line and a second output potential different from said first output potential on a second line, said first line coupled to said first center-tap of said first transformer and said second line coupled to said second center-tap of said first transformer.

21. A method for supplying a DC power connection and a bi-directional data connection to a remote device, said bi-directional data connection including a first data signal and a second data signal, said method comprising:

transmitting the first data signal to a first primary winding of a first transformer;

receiving the second data signal from a second primary winding of said first transformer;

transmitting the first data signal from a first secondary winding of said first transformer to a first terminal;

receiving the second data signal from a second terminal; and applying a DC signal between a center-tap of said first secondary winding of said first transformer and a center-tap of said second secondary winding of said first transformer.

22. A power feed system for Ethernet telephones, said system comprising:

first coupling means for coupling a first conductor of a first pair of conductors to a first winding of a first transformer;

second coupling means for coupling a second conductor of said first pair of conductors to a second winding of said first transformer;

a first and second center-tapped winding disposed in said first transformer, each said winding having a first conductor, a second conductor and a center-tap conductor; and means for applying a power signal to said first center tap conductor and said second center-tap conductor of said first transformer.

23. A system for supplying DC power to a remote device, said system comprising:

first coupling means for coupling a first conductor of a first pair of conductors to a first winding of a first transformer;

second coupling means for coupling a second conductor of said first pair of conductors to a second winding of said first transformer;

a first and second center-tapped winding disposed in said first transformer, each said winding having a first conductor, a second conductor and a center-tap conductor; and means for applying a power signal to said first center tapped conductor and said second center-tapped conductor of said first transformer.

24. A method for supplying DC power to a remote device over an Ethernet connection having a first twisted pair of conductors for transmission of data packets from said remote device and a second twisted pair of conductors for reception of data packets at said remote device, the method comprising:

applying a first voltage level of the DC power to a center tap of a first transformer winding connected across a distal end of the first twisted pair of conductors;

applying a second voltage level of the DC power to a center tap of a second transformer winding connected across a distal end of the second twisted pair of conductors, said record voltage level being different from said first voltage level;

extracting said first voltage level from a center tap of a third transformer winding coupled across a proximal end of the first twisted pair of conductors; and extracting said second voltage level from a center tap of a fourth transformer winding coupled across a proximal end of the second twisted pair of conductors.

25. A system for supplying DC power to a remote device over an Ethernet connection having a first twisted pair of conductors for transmission of data packets from said remote device and a second twisted pair of conductors for receptions of data packets at said remote device, the system comprising:

means for applying a first voltage level of the DC power to a center tap of a first transformer winding connected across a distal end of the first twisted pair of conductors;

means for applying a second voltage level of the DC power to a center tap of a second transformer winding connected across a distal end of the second twisted pair of conductors, said second voltage level being different from said first voltage level;

means for extracting said first voltage level from a center tap of a third transformer winding coupled across a proximal end of the first twisted pair of conductors; and means for extracting said second voltage level from a center tap of a fourth transformer winding coupled across a proximal end of the second twisted pair of conductors.

26. A system according to claim 25 further comprising an uninterruptible power supply for sourcing the DC power.

27. A method for supplying DC power to a remote device over an Ehernet connection having a first twisted pair of conductors for transmission of data packets from said remote device and a second twisted pair of conductors for reception of data packets at said remote device, the method comprising:

applying a first voltage level of the DC power to a center tap of a first transformer winding coupled across a distal end of the first twisted pair of conductors;

applying a second voltage level of the DC power to a center tap of a second transformer winding coupled across a distal end of the second twisted pair of conductors, said record voltage level being different from said first voltage level.

28. A system for supplying DC power to a remote device over an Ethernet connection having a first twisted pair of conductors for transmission of data packets from said remote device and a second twisted pair of conductors for reception of data packets at a said remote device, the system comprising:

means for applying a first voltage level of the DC power to a center tap of a first transformer winding coupled across a distal end of the first twisted pair of conductors; and means for applying a second voltage level of the DC power to a center tap of a second transformer winding coupled across a distal end of the second twisted pair of conductors, said second voltage level being different from said first voltage level.

29. A system according to claim 28 further comprising an uninterruptible power supply for sourcing the DC power.

30. A power feed system for network devices, said system comprising:

a first primary transformer winding, a second primary transformer winding, a first secondary transformer winding with a first center-tap and a second secondary transformer winding with a second center-tap, said first primary transformer winding for coupling to a first pair of conductors, said second primary transformer winding for coupling to a second pair of conductors;

a third primary transformer winding with a third center-tap, a fourth primary transformer winding with a fourth center-tap, a third secondary transformer winding and a fourth secondary transformer winding, said third and fourth secondary transformer windings for coupling to a network device;

a network link including a third pair of conductors and a fourth pair of conductors, said third pair of conductors coupling said first secondary transformer winding with said third primary transformer winding and said fourth pair of conductors coupling said second secondary transformer winding with said fourth primary transformer winding;

a direct current power supply having a first output potential on a first line and a second output potential different from said first output potential on a second line, said first line coupled to said first center-tap and said second line coupled to said second center-tap;

a first potential input of a network device coupled to said third center-tap; and a second potential input of a network device coupled to said fourth center-tap.

31. A power feed system for network devices according to claim 30, wherein said third pair of conductors is a twisted pair.

32. A power feed system for network devices according to claim 31, wherein said fourth pair of conductors is a twisted pair.

33. A power feed system for network devices according to claim 32, wherein said first pair of conductors is a twisted pair.

34. A power feed system for network devices according to claim 33, wherein said second pair of conductors is a twisted pair.

35. A system accordingly to claim 30 wherein said network device is an Ethernet telephone.

36. A system for supplying DC power to a remote device, said system comprising:

a first primary transformer winding, a second primary transformer winding, a first secondary transformer winding with a first center-tap and a second secondary transformer winding with a second center-tap, said first primary transformer winding for coupling to a first pair of conductors, said second primary transformer winding for coupling to a second pair of conductors;

a third primary transformer winding with a third center-tap, a fourth primary transformer winding with a fourth center-tap, a third secondary transformer winding and a fourth secondary transformer winding, said third and fourth secondary transformer windings for coupling to the remote device;

a network including a third pair of conductors and a fourth pair of conductors, said third pair of conductors coupling said first secondary transformer winding with said third primary transformer winding and said fourth pair of conductors coupling said second secondary transformer winding with said fourth primary transformer winding;

a direct current power supply having a first output potential on a first line and a second output potential different from said first output potential on a second line, said first line coupling to said first center-tap and said second line coupling to said second center-tap;

a first potential input of the remote device coupled to said third center-tap; and a second potential input of the remote device coupled to said fourth center-tap.

37. A system according to claim 36, wherein said third pair of conductors is a twisted pair.

38. A system according to claim 37, wherein said fourth pair of conductors is a twisted pair.

39. A system according to claim 38, wherein said first pair of conductors is a twisted pair.

40. A system according to claim 39, wherein said second pair of conductors is a twisted pair.

41. A system for transmitting data and a DC signal simultaneously between a first device and a second device, said system comprising:

a first primary transformer winding, a second primary transformer winding, said first secondary transformer winding having a first center-tap and said second secondary transformer winding having a second center-tap, said first primary transformer winding for coupling to a first pair of conductors over which a first data signal is to be communicated with the first device, said second primary transformer winding for coupling to a second pair of conductors over which a second data signal is to be communicated with the first device;

a third primary transformer winding with a third center-tap, a fourth primary transformer winding with a fourth center-tap, a third secondary transformer winding and a fourth secondary transformer winding, said third secondary transformer winding for coupling to a third pair of conductors over which said first data signal is to be communicated with the second device, and said fourth secondary transformer winding for coupling to a fourth pair of first conductors over which said second data signal is to be communicated with the second device;

a link including a fifth pair of conductors and a sixth pair of conductors, said fifth pair of conductors coupling said first secondary transformer winding with said third primary transformer winding and said sixth pair of conductors coupling said second secondary transformer winding with said fourth primary transformer winding;

a direct current power supply associated with the first device having a first output potential on a first line and a second output potential different from said first output potential on a second line, said first line coupled to said first center-tap and said second line coupled to said second center-tap;

a first potential input of the second device coupled to said third center-tap; and a second potential input of the second device coupled to said fourth center-tap.

42. A method for supplying a DC power connection and a bi-directional data connection to a remote device, said bi-directional data connection including a first data signal and a second data signal, said method comprising:

transmitting the first data signal to a first primary transformer winding;

receiving the second data signal from a second primary transformer winding;

transmitting the first data signal from a first secondary transformer winding to a third primary transformer winding;

transmitting the second data signal from a fourth primary transformer winding to a second secondary transformer winding;

transmitting the first data signal to the device over a third secondary transformer winding;

receiving the second data signal from the device over a fourth secondary transformer winding;

applying a DC signal between a center-tap of said first secondary transformer winding and a center-tap of said second secondary transformer winding;

extracting a DC signal from a center-tap of said third primary transformer winding and a center-tap of said fourth primary transformer winding; and applying said DC signal to the remote device.

43. A power feed system for network devices, said system comprising:

first coupling means for coupling a first and second conductor of a first pair of conductors to a first primary transformer winding;

second coupling means for coupling a first and second conductor of a second pair of conductors to a second primary transformer winding;

third coupling means for coupling a first and second conductor of a third pair of conductors to a third primary transformer winding;

fourth coupling means for coupling a first and second conductor of a fourth pair of conductors to a fourth primary transformer winding;

fifth coupling means for coupling a first and second conductor, respectively, of a network device to said first and second conductor of said third pair of conductors and coupling a third and fourth conductor, respectively, of the network device to said first and second conductor of said fourth pair of conductors;

a first center-tapped transformer winding magnetically coupled to said first primary transformer winding, said first center-tapped transformer winding having a first center-tap;

a second center-tapped transformer winding magnetically coupled to said second primary transformer winding, said second center-tapped transformer winding having a second center-tap;

a third center-tapped transformer winding magnetically coupled to said third primary transformer winding, said third center-tapped transformer winding and having a third center-tap;

a fourth center-tapped transformer winding magnetically coupled to said fourth primary transformer winding, said third center-tapped transformer winding having a fourth center-tap;

means for coupling said first center-tapped transformer winding to said third center-tapped transformer winding;

means for coupling said second center-tapped transformer winding to said fourth center-tapped transformer winding;

means for applying a power signal to said first center-tap and said second center-tap; and means for extracting a power signal from said third center-tap and said fourth center-tap and for applying said extracted power signal to said network device.

44. A system accordingly to claim 43 wherein said network device is an Ethernet telephone.

45. A system for supplying DC power to a remote device, said system comprising:

first coupling means for coupling a first pair of conductors to a first primary transformer winding;

second coupling means for coupling a second pair of conductors to a second transformer winding;

third coupling means for coupling third pair of conductors to a third primary transformer winding;

fourth coupling means for coupling a fourth pair of conductors to a fourth primary transformer winding;

fifth coupling means for coupling a first and second pair of conductors, respectively, of the remote device to said third and fourth pairs of conductors;

a first center-tapped transformer winding magnetically coupled to said first primary transformer winding, said first center-tapped transformer winding having a first center-tap;

a second center-tapped transformer winding magnetically coupled to said second primary transformer winding, said second center-tapped transformer winding having a second center-tap;

a third center-tapped transformer winding magnetically coupled to said third primary transformer winding, said third center-tapped transformer winding having a third center-tap;

a fourth center-tapped transformer winding magnetically coupled to said fourth primary transformer winding, said fourth center-tapped transformer winding having a fourth center-tap;

means for coupling said first center-tapped transformer winding to said third center-tapped transformer winding;

means for coupling said second center-tapped transformer winding to said fourth center-tapped transformer winding;

means for applying a power signal to said first center tap and said second center tap; and means for extracting a power signal from said third center tap and said fourth center tap and for applying said extracted power signal to the remote device.

46. A method for supplying DC power to a remote device over a connection having a first twisted pair of conductors for transmission of data packets from said remote device and a second twisted pair of conductors for reception of data packets at said remote device, the method comprising:

applying a first polarity of the DC power to a center tap of a first transformer winding coupled across a distal end of the first twisted pair of conductors;

applying a second polarity of the DC power to a center tap of a second transformer winding coupled across a distal end of the second twisted pair of conductors;

coupling the first transformer winding to the third transformer winding;

coupling the second transformer winding to the fourth transformer winding;

extracting said first polarity from a center tap of a third transformer winding coupled across a proximal end of the first twisted pair of conductors; and extracting said second polarity from a center tap of a fourth transformer winding coupled across a proximal end of the second twisted pair of conductors.

47. A system for supplying DC power to a remote device over a connection having a first twisted pair of conductors for transmission of data packets from said remote device and a second twisted pair of conductors for reception of data packets at said remote device, the system comprising:

means for applying a first polarity of the DC power to a center tap of a first transformer winding coupled across a distal end of the first twisted pair of conductors;

means for applying a second polarity of the DC power to a center tap of a second transformer winding coupled across a distal end of the second twisted pair of conductors;

means for coupling the first transformer winding to the means for coupling the first transformer winding to the third transformer winding;

means for coupling the first transformer winding to the means for coupling the second transformer winding to the fourth transformer winding;

means for extracting said first polarity from a center tap of a third transformer winding coupled across a proximal end of the first twisted pair of conductors; and means for extracting said second polarity from a center tap of a fourth transformer winding coupled across a proximal end of the second twisted pair of conductors.

48. A system according to claim 47 further comprising an uninterruptible power supply for sourcing the DC power.

49. A power feed system for network devices, said system comprising:

a first primary transformer winding, a second primary transformer winding, a first secondary transformer winding with a second center-tap, said first primary transformer winding for coupling to a first pair of conductors, said second primary transformer winding for coupling to a second pair of conductors; and a direct current power supply having a first output potential on a first line and a second output potential different from said first output potential on a second line, said first line connected to said first center-tap of said second line connected to said second center-tap of said first transformer.

50. A power feed system for network devices according to claim 49, wherein said first pair of conductors is a twisted pair.

51. A power feed system for network devices according to claim 50, wherein said second pair of conductors is a twisted pair.

52. A system for supplying DC power to a remote device, said system comprising:

a first primary transformer winding, a second primary transformer winding, a first secondary transformer winding with a first center-tap and a second secondary transformer winding with a second center-tap, said first primary transformer winding for coupling to a first pair of conductors, said second primary transformer winding for coupling to a second pair of conductors;

a direct current power supply having a first output potential on a first line and a second output potential different from said first output potential on a second line, said first line connected to said first center-tap of said first transformer and said second line connected to said second center-tap of said first transformer.

53. A system according to claim 52, wherein said first pair of conductors is a twisted pair.

54. A system according to claim 53, wherein said second pair of conductors is a twisted pair.

55. A system for transmitting data and a DC signal simultaneously between a first device and a second device, said system comprising:

a first transformer including a first primary, a second primary, a first secondary with a first center-tap and said second secondary with a second center-tap, said first primary for coupling to a first pair of conductors over which a first data signal is to be communicated with the first device, said second primary for coupling to a second pair of conductors over which a second data signal is to be communicated with the first device; and a direct current power supply associated with the first device having a first output potential on a first line and a second output potential different from said first output potential on a second line, said first line coupled to said first center-tap of said first transformer and said second line coupled to said second center-tap of said first transformer.

56. A method for supplying a DC power connection and a bi-directional data connection to a remote device, said bi-directional data connection including a first data signal and a second data signal, said method comprising:

transmitting the first data signal to a first primary transformer winding of a first transformer;

receiving the second data signal from a second primary winding of said first transformer; and applying a DC signal between a center-tap of said first secondary winding of said first transformer and a center-tap of said second secondary winding of said first transformer.

57. A power feed system for network devices, said system comprising:

first coupling means for coupling a first conductor of a first pair of conductors to a first winding of a first transformer;

second coupling means for coupling a second conductor of a first pair of conductors to a first winding of a first transformer;

a first and second center-tapped transformer winding disposed in said first transformer, each said winding having a first conductor and a center-tap conductor; and means for applying a power signal to said first center-tap conductor and said second center-tap conductor of said first transformer.

58. A system for supplying DC power to a remote device, said system comprising:

first coupling means for coupling a first conductor of a first pair of conductors to a second winding of said first transformer;

second coupling means for coupling a second conductor of said first pair of conductors to a second winding of said first transformer;

a first and second center-tapped winding disposed in said first transformer, each said winding having a first conductor, a second conductor and a center-tap conductor; and means for applying a power signal to said first center-tapped conductor and said second center-tapped conductor of said first transformer.

59. A method for supplying DC power to a remote device from a local device over a connection having a first twisted pair of conductors for transmission of data packets from said remote device and a second twisted pair of conductors for reception of data packets at said remote device, the method comprising:

applying a first polarity of the DC power to a center tap of a first transformer winding connected across an end of the first twisted pair of conductors disposed at the local device;

applying a second polarity of the DC power to a center tap of a second transformer winding connected across an end of the second twisted pair of conductors disposed at the local device.

60. A system for supplying DC power to a remote device from a local device from a local device over a connection having a first twisted pair of conductors for transmission of data packets from said remote device and a second twisted pair of conductors for reception of data packets at said remote device, the system comprising:

means for applying a first polarity of the DC power to a center tap of a first transformer winding connected across an end of the first twisted pair of conductors disposed at the local device; and means for applying a second polarity of the DC power to a center tap of a second transformer winding connected across an end of the second twisted pair of conductors disposed at the local device.

* * * * *

UNITED STATES PATENT AND TRADEMARK OFFICE
CERTIFICATE OF CORRECTION

PATENT NO. : 6,295,356 B1
DATED : September 25, 2001
INVENTOR(S) : De Nicolo

Page 1 of 1

It is certified that error appears in the above-identified patent and that said Letters Patent is hereby corrected as shown below:

Column 3,
Line 34, replace "of the" with -- and --.
Line 35, replace "B2" with -- 132 --.
Line 35, replace "several" with -- second --.

Column 5,
Line 50, after "transformer;" insert -- and --.

Column 8,
Line 39, after "conductors;" insert -- and --.

Column 13,
Line 47, after "conductors;" insert -- and --.

Column 14,
Line 60, after "device;" insert -- and --.

Column 15,
Line 2, after "from a local device" delete "from a local device".

Signed and Sealed this

Twenty-third Day of April, 2002

*Attest:*

*Attesting Officer*

JAMES E. ROGAN
*Director of the United States Patent and Trademark Office*